United States Patent
Fripp et al.

(10) Patent No.: US 11,840,661 B2
(45) Date of Patent: Dec. 12, 2023

(54) FILTER PLUG TO PREVENT PROPPANT FLOWBACK

(71) Applicant: Halliburton Energy Services, Inc., Houston, TX (US)

(72) Inventors: Michael Linley Fripp, Carrollton, TX (US); Richard Decena Ornelaz, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/116,076

(22) Filed: Dec. 9, 2020

(65) Prior Publication Data

US 2022/0177769 A1 Jun. 9, 2022

(51) Int. Cl.
*C09K 8/518* (2006.01)
*B01D 39/20* (2006.01)
*E21B 43/02* (2006.01)
*E21B 43/267* (2006.01)

(52) U.S. Cl.
CPC .......... *C09K 8/518* (2013.01); *B01D 39/2051* (2013.01); *E21B 43/02* (2013.01); *E21B 43/267* (2013.01)

(58) Field of Classification Search
CPC ..... C09K 8/518; B01D 39/2051; E21B 43/02; E21B 43/267
See application file for complete search history.

(56) References Cited

U.S. PATENT DOCUMENTS

| 7,748,468 | B2 | 7/2010 | Casciaro |
| 7,926,565 | B2 | 4/2011 | Duan et al. |
| 8,727,010 | B2 | 5/2014 | Turner et al. |
| 9,638,003 | B2 | 5/2017 | George et al. |
| 9,915,749 | B2 | 3/2018 | Khoo et al. |
| 2007/0039741 | A1 | 2/2007 | Hailey, Jr. |
| 2009/0173490 | A1* | 7/2009 | Dusterhoft ............ E21B 43/086 166/229 |
| 2015/0337633 | A1* | 11/2015 | Legrand ................ E21B 47/017 166/185 |
| 2016/0348467 | A1 | 12/2016 | Watson et al. |
| 2020/0088012 | A1* | 3/2020 | Loh ....................... E21B 43/084 |

FOREIGN PATENT DOCUMENTS

EP 2045437 B1 1/2012

* cited by examiner

*Primary Examiner* — Crystal J. Lee
(74) *Attorney, Agent, or Firm* — Scott Richardson; Parker Justiss, P.C.

(57) ABSTRACT

Provided is a filter plug, a well system, and a method for fracturing a well system. The filter plug, in one aspect, includes a filtration skeleton. The filter plug according to this aspect further includes a degradable material in contact with the filtration skeleton, the filtration skeleton and degradable material configured to lodge within a port in a wellbore, and thus substantially plug the port when the degradable material remains intact with the filtration skeleton and allow the filtration skeleton to filter particulate matter as fluid passes there through when the degradable material no longer remains intact with the filtration skeleton.

18 Claims, 7 Drawing Sheets

FILTER PLUG TO PREVENT PROPPANT FLOWBACK

BACKGROUND

The process of induced hydraulic fracturing involves injecting a fracturing fluid at a high pressure into a fracturing zone of interest. Small fractures are formed, allowing fluids, such as gas and petroleum to migrate into the wellbore for producing to the surface. Often the fracturing fluid is mixed with proppants (e.g., sand) and chemicals in water so that once the pressure is removed, the sand or other particles hold the fractures open. Hydraulic fracturing is a type of well stimulation, whereby the fluid removal is enhanced, and well productivity is increased.

Multi-stage hydraulic fracturing is an advancement to produce fluids along a single wellbore or fracturing string. Multiple stages allow the fracturing fluid to be targeted at individual zones. Zones are typically fractured in a sequence. Previously fractured zones are isolated from the next zones to be fracture.

In a multi-stage fracturing process, previously fractured zones must be isolated from the zones that are going to be stimulated. Traditionally, isolation is performed with a ball that lands on a ball seat, which is positioned within a particular zone of interest in the wellbore. Hydraulic fracturing can be performed in stages by selectively activating sleeves with one or more balls and ball seats. Each target zone can thus be hydraulically fractured, stage by stage (e.g., toe to heal).

BRIEF DESCRIPTION

Figure 1:
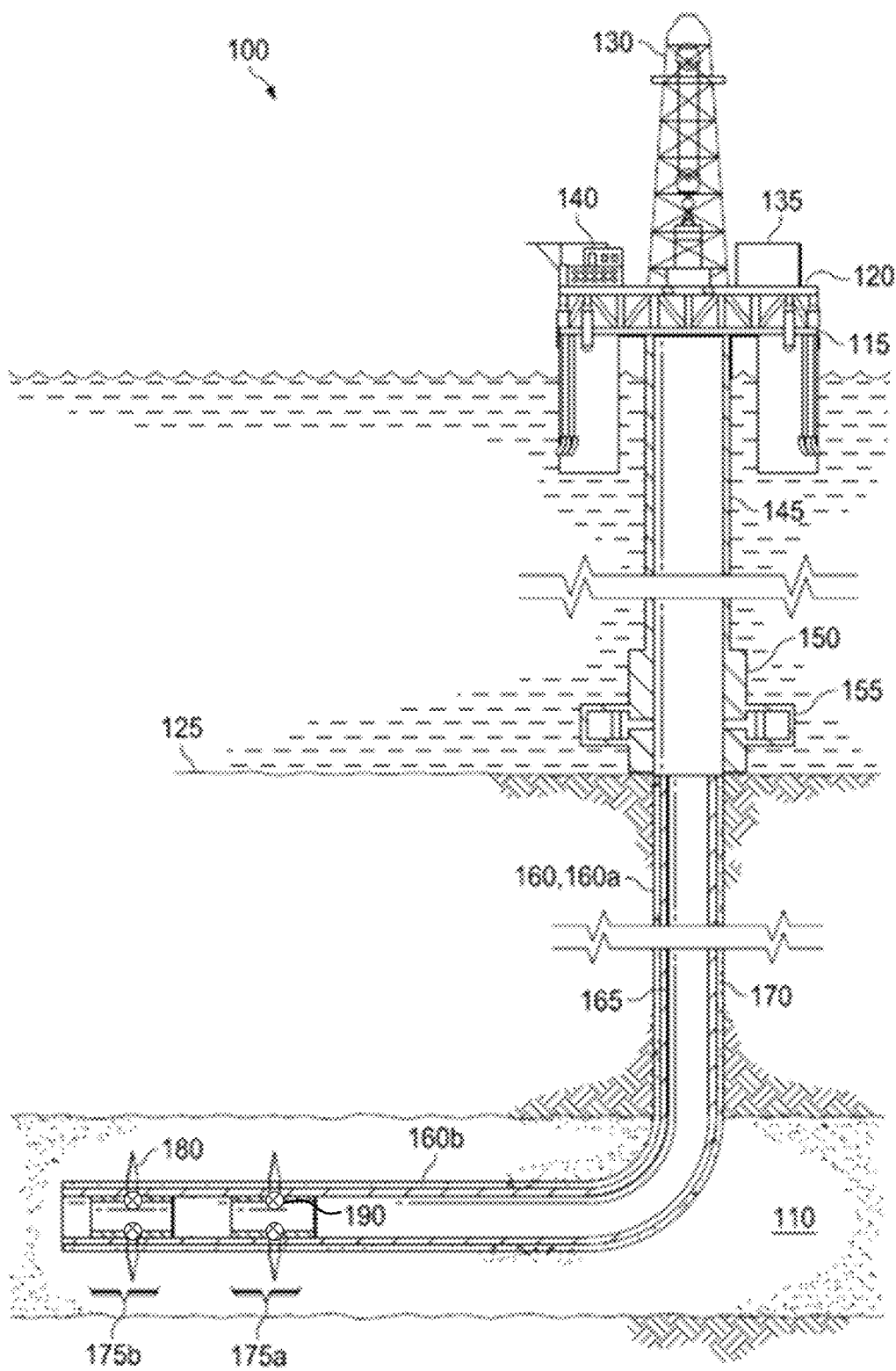
Figure 2A:
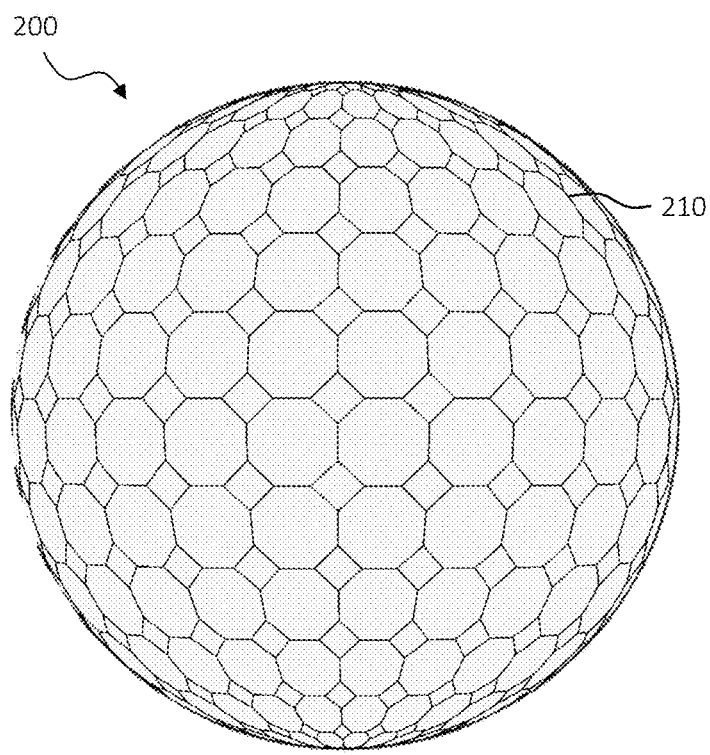
Figure 2B:
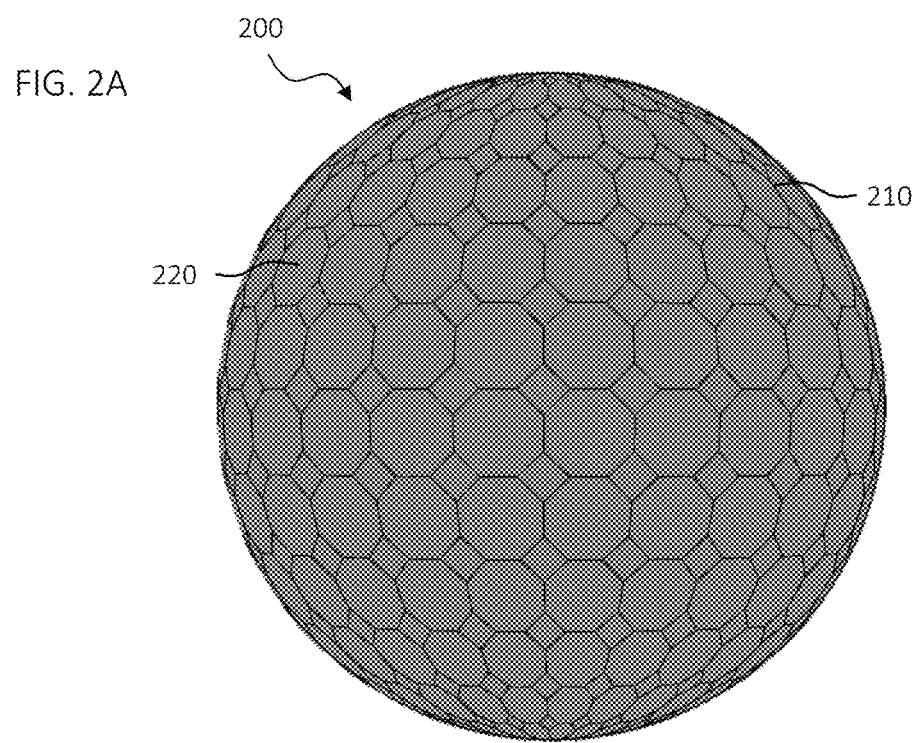

Reference is now made to the following descriptions taken in conjunction with the accompanying drawings, in which:

FIG. 1 schematically illustrates a well system, including one or more filtering plugs designed, manufactured and operated according to the present disclosure;

FIGS. 2A and 2B schematically illustrate different operational states of a filter plug designed, manufactured and used according to one or more embodiments of the disclosure;

FIGS. 3A through 3E schematically illustrate different steps associated with a method for fracturing a well system according to one or more embodiments of the disclosure.

DETAILED DESCRIPTION

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally toward the surface of the ground; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. In such instances, the terms "up," "upper," "upward," "uphole," "upstream," or other like terms shall be used to represent the toward the surface end of a well. Unless otherwise specified, use of the term "subterranean formation" shall be construed as encompassing both areas below exposed earth and areas below earth covered by water such as ocean or fresh water.

Referring initially to FIG. 1, schematically illustrated is a well system 100, including one or more filter plugs 190 designed, manufactured and operated according to the present disclosure, and positioned at a desired location in a subterranean formation 110. The well system 100 of FIG. 1, without limitation, includes a semi-submersible platform 115 having a deck 120 positioned over the submerged subterranean formation 110, which in this embodiment is located below sea floor 125. The platform 115, in the illustrated embodiment, may include a hoisting apparatus/derrick 130 for raising and lowering work string, as well as a fracturing pump 135 for conducting a fracturing process of the subterranean formation 110 according to the disclosure. The well system 100 illustrated in FIG. 1 may additionally include a control system 140 located on the deck 120. The control system 140, in one embodiment, may be used to control the fracturing pump 135, as well as may be communicatively, e.g., electrically, electromagnetically or fluidly, coupled to one or more other downhole tools, among other possible uses.

A subsea conduit 145 extends from the platform 115 to a wellhead installation 150, which may include one or more subsea blow-out preventers 155. A wellbore 160 extends through the various earth strata including the subterranean formation 110. In the embodiment of FIG. 1, wellbore tubing 165 (e.g., wellbore casing) is cemented within wellbore 160 by cement 170, but embodiments exist wherein the wellbore 160 is not cemented, or only partially cemented. In the illustrated embodiment, wellbore 160 has an initial, generally vertical portion 160a and a lower, generally deviated portion 160b, which is illustrated as being horizontal. It should be noted by those skilled in the art, however, that the one or more filter plugs 190 of the present disclosure are equally well-suited for use in other well configurations including, but not limited to, inclined wells, wells with restrictions, non-deviated wells and the like. Moreover, while the wellbore 160 is positioned below the sea floor 125 in the illustrated embodiment of FIG. 1, those skilled in the art understand that the principles of the present disclosure are equally as applicable to other subterranean formations, including those encompassing both areas below exposed earth and areas below earth covered by water such as ocean or fresh water.

In accordance with one embodiment of the disclosure, each of the one or more filter plugs 190 include a filtration skeleton. Each of the one or more filter plugs 190, in at least this embodiment, additionally include a degradable material in contact with the filtration skeleton. As illustrated, the filtration skeleton and degradable material (e.g., for at least as long as the degradable material remains intact) are configured to lodge within a port in a wellbore, such as a fracturing port in the wellbore 160. The term lodge, as used herein, means to stick within the port, as opposed to entirely passing through the port. Accordingly, at least a portion of the filtration skeleton and/or degradable material remains within the port for a period of time. The filtration skeleton and degradable material allow the filter plug 190 to perform multiple distinct tasks. For example, when the degradable material remains intact with the filtration skeleton, the one or more filter plugs 190 may substantially plug the port, and thus may act as a flow diversion during the hydraulic fracturing of other zones of interest. However, when the degradable material does not remain intact with the filtration skeleton (e.g., the degradable material degrades at least partially or entirely) the one or more filter plugs 190 remain lodged within the port to filter particulate matter as it enters the wellbore tubing 165 from the formation 110, and thus may act as a particulate matter screen (e.g., proppant screen, sand screen, etc.).

The ability to immediately and automatically (e.g., by dropping the one or more filter plugs 190 within the wellbore 160) close the port within a given zone of interest after hydraulic fracturing the subterranean formation surrounding the port has many important benefits. For example, the use of the one or more filter plugs 190 may reduce (e.g., eliminate) the need for subsequent cleanup runs. Additionally, the use of the one or more filter plugs 190 helps keep the proppant in the subterranean formation 110 rather than in the wellbore tubing 165. Furthermore, the use of the one or more filter plugs 190 helps keep the throat of the fracture filled with the proppant.

Turning to FIGS. 2A and 2B, schematically illustrated are different operational states of a filter plug 200 designed, manufactured and used according to one or more embodiments of the disclosure. FIG. 2A illustrates the filter plug 200 including a filtration skeleton 210, wherein FIG. 2B illustrates the filter plug 200 with the filtration skeleton 210, and a degradable material 220 in contact with the filtration skeleton 210. Accordingly, the filter plug 200 of FIG. 2A illustrates the filtration skeleton 210 prior to the degradable material 220 coming into contact therewith, or alternatively illustrates the filtration skeleton 210 after the degradable material 220 no longer remains intact with the filtration skeleton 210 (e.g., has at least partially or entirely degraded). In contrast, the filter plug 200 of FIG. 2B illustrates the filtration skeleton 210 with the degradable material 220 remaining intact with the filtration skeleton 210.

The filtration skeleton 210 may take on many different sizes and remain within the scope of the present disclosure. Ideally, the filtration skeleton 210 would be sized to lodge within a port in a wellbore, such as lodge within a fracturing port in a wellbore. Accordingly, the size of the filtration skeleton 210 would often be based upon the size of the port within the wellbore. The filtration skeleton 210 need not be a perfect sphere, but alternatively could be shaped like a knot or other irregular shape. In another embodiment, the filtration skeleton is cone shaped (e.g., shaped like a shuttlecock) such that fluid pushing the filter plug 200 downhole aligns the nose of the cone with the port.

The filtration skeleton 210 may additionally take on many different configurations and remain with the scope of the present disclosure. For example, in one embodiment, the filtration skeleton 210 comprises a single interconnected structure. For example, the single interconnect structure could be a single constructed shape in one embodiment. In another embodiment, the single interconnected structure could be a single foam structure (e.g., metal foam structure). In yet another embodiment, the single interconnected structure could be a single open cell foam structure (e.g., single open cell metal foam structure). In yet another embodiment, the single interconnected structure is a woven or braided structure. Nevertheless, other single interconnected structures are within the scope of the disclosure.

In yet another embodiment, the filtration skeleton 210 comprises a collection of separate interconnected elements that when brought together lodge with one another to form a unit. For example, the filtration skeleton 210 could comprise a self-assembling collection of separate interconnected elements that when brought together lodge with one another to form a unit. In one embodiment, these interconnected elements are acicular shaped. These nail-like parts will lock together and, in some cases, will create an arch. The interconnected elements will match the shape of the port in the wellbore tubing. Testing has shown that a high concentration of separate interconnected acicular elements can create an arch with a wide span that can filter various different sizes of particulate matter, including various different sizes of proppant. The separate interconnected acicular elements can create a single filtration unit when in sufficient concentration, which can in turn prevent proppant flow back. Flow rates of at least 50-100 barrels per day may be supported by the single filtration unit. For example, it has been measured that a 12 mm fill height of 12 mm long wire on a 12 mm port filtered particulate matter at a flow rate of 50 barrels per day. Additionally, it has been measured that a 50 mm fill height of 12 mm long wire on a 50 mm port filtered particulate matter at a flow rate of 120 barrels per day, which illustrates that scaling the particles to smaller size would aid in the filtration. The pressure drop across the interconnected acicular elements was measured at less than 1 psi/foot at flow rates of 1000 barrels per day. Furthermore, the porosity of the interconnected acicular elements was measured at over 70% porosity (sand was measured at 30% porosity).

The filtration skeleton 210 may comprise many different materials and remain within the scope of the disclosure. In one embodiment, the filtration skeleton 210 comprises a metal, such as a metal foam. In an alternative embodiment, the filtration skeleton 210 might comprise plastic, or in yet another embodiment may comprise a ceramic. In yet another embodiment, the filtration skeleton 210 comprises a swellable material (e.g., polymer in one embodiment) configured to swell when the degradable material 220 no longer remains intact therewith. Accordingly, as the degradable material 220 exposes the filtration skeleton 210 to fluid, the filtration skeleton 210 may swell and better lodge itself within the port. In yet another embodiment, the filtration skeleton 210 is in a first compressed state when the degradable material 220 remains intact with the filtration skeleton 210, and moves to a second uncompressed state when the degradable material 220 no longer remains intact with the filtration skeleton 210. Accordingly, as the degradable material 220 is no longer intact with the filtration skeleton 210, the filtration skeleton 210 will move from the first compressed state to the second uncompressed state, and thus better lodge itself within the port. Any know process, including 3-D printing, may be used to form the filtration skeleton 210.

Ideally, what results after the degradable material 220 degrades from the filtration skeleton 210, is a filtration skeleton including a porosity operable to filter particulate matter having a predetermined minimum dimension. For example, in one embodiment, the filtration skeleton including a porosity operable to filter particulate matter having a minimum dimension of at least 140 mesh. In another embodiment, what results is a filtration skeleton including a porosity operable to filter particulate matter having a minimum dimension of at least 80 mesh, or in yet another embodiment a porosity operable to filter particulate matter having a minimum dimension of at least 40 mesh.

With reference to FIG. 2B, the degradable material 220 may take on many different configurations and remain within the scope of the disclosure. For example, in one embodiment, the degradable material 220 is a matrix of degradable material substantially filling the filtration skeleton 210. According to this embodiment, the degradable material 220 would be molded onto the filtration skeleton 210 and thus fill at least a portion (or the entirety) of the porosity of the filtration skeleton 210. In yet another embodiment, the degradable material 220 is a layer of degradable material substantially surrounding the filtration skeleton 210 (e.g., as opposed to a matrix of degradable material filling at least a portion of the filtration skeleton 210).

The degradable material 220 may comprise many different materials and remain within the scope of the disclosure, so long as the degradable material remains intact for a predetermined amount of time. For example, in one embodiment the degradable material comprises a material configured to remain intact for at least 1 hour, or in yet another embodiment at least 48 hours. In one embodiment, the degradable material is a dissolvable material. In one embodiment, however, the degradable material 220 comprises a rubber, for example such as polyurethane. In yet another embodiment, the degradable material 220 is plastic, for example an aliphatic polyester. In even yet another embodiment, the degradable material 220 includes a polylactic acid polymer, polyglycolic acid polymer, polyvinyl alcohol polymer, or acetate polymer. Other embodiments may employ borate, salt, sugar, or a degradable metal, among others, as the degradable material 220. In another embodiment, the degradable material is a meltable material. The meltable material is warmed by the formation and degrades. The meltable material may be a metal or a polymer. A combination of degradable materials may be used.

Turning to FIGS. 3A through 3E, schematically illustrated are different steps associated with a method for fracturing a well system 300 according to one or more embodiments of the disclosure. The well system 300, in the illustrated embodiment, includes a subterranean formation 310 having a wellbore 315 extending there through. Located in the wellbore 315 proximate the subterranean formation is wellbore tubing 320 (e.g., wellbore casing in one embodiment). The wellbore tubing 320, in the illustrated embodiment, has one or more ports 325 (e.g., for allowing fluid to flow in a radial direction) located at one or more subterranean zones of interest 330. The one or more ports 325 may be premachined ports (e.g., formed uphole prior to the wellbore tubing 320 being inserted in the wellbore 315, for example located behind a movable sleeve) or alternatively fracturing ports (e.g., formed in the wellbore tubing 320 after the wellbore tubing 320 is inserted into the wellbore 315). While not specifically shown, in certain embodiments, the plurality of ports 325 are located at varying different axial locations in the wellbore tubing 320 The well system 300 additionally includes a sleeve 340, such as a sliding sleeve having a ball seat 345, disposed within the wellbore tubing 320.

Figure 3A:
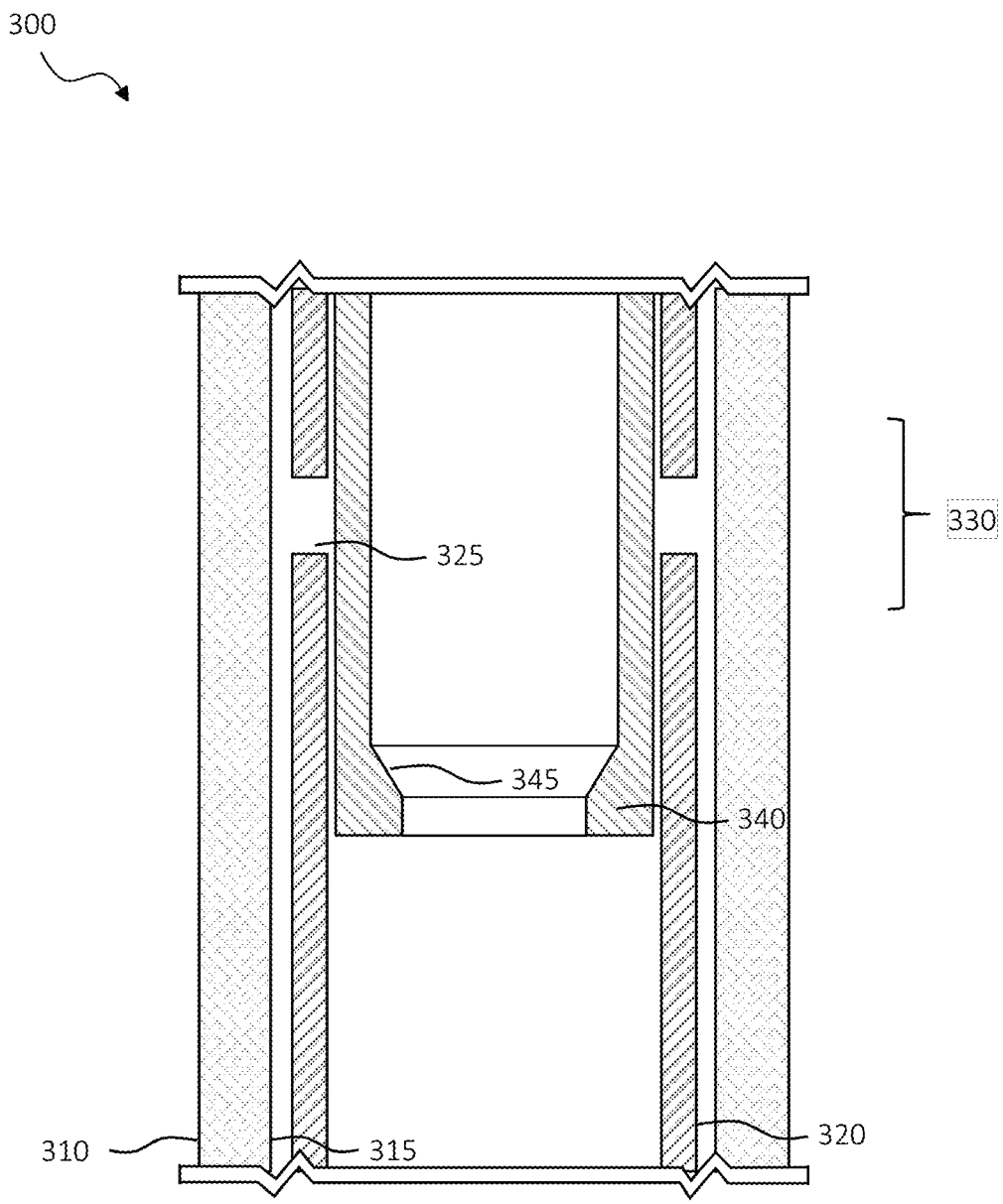

With initial reference to FIG. 3A, the sleeve 340 is positioned in a closed state, so as to block access to the one or more ports 325. Accordingly, any hydraulic fracturing processes being conducted uphole or downhole of the sleeve 340 would not affect the subterranean zones of interest 330. Often multi-stage hydraulic fracturing begins at a downhole most subterranean zone of interest, and then sequentially moves uphole from there (e.g., a toe to heel hydraulic fracturing process). Nevertheless, the present disclosure is not limited to such toe to heel hydraulic fracturing processes.

Figure 3B:
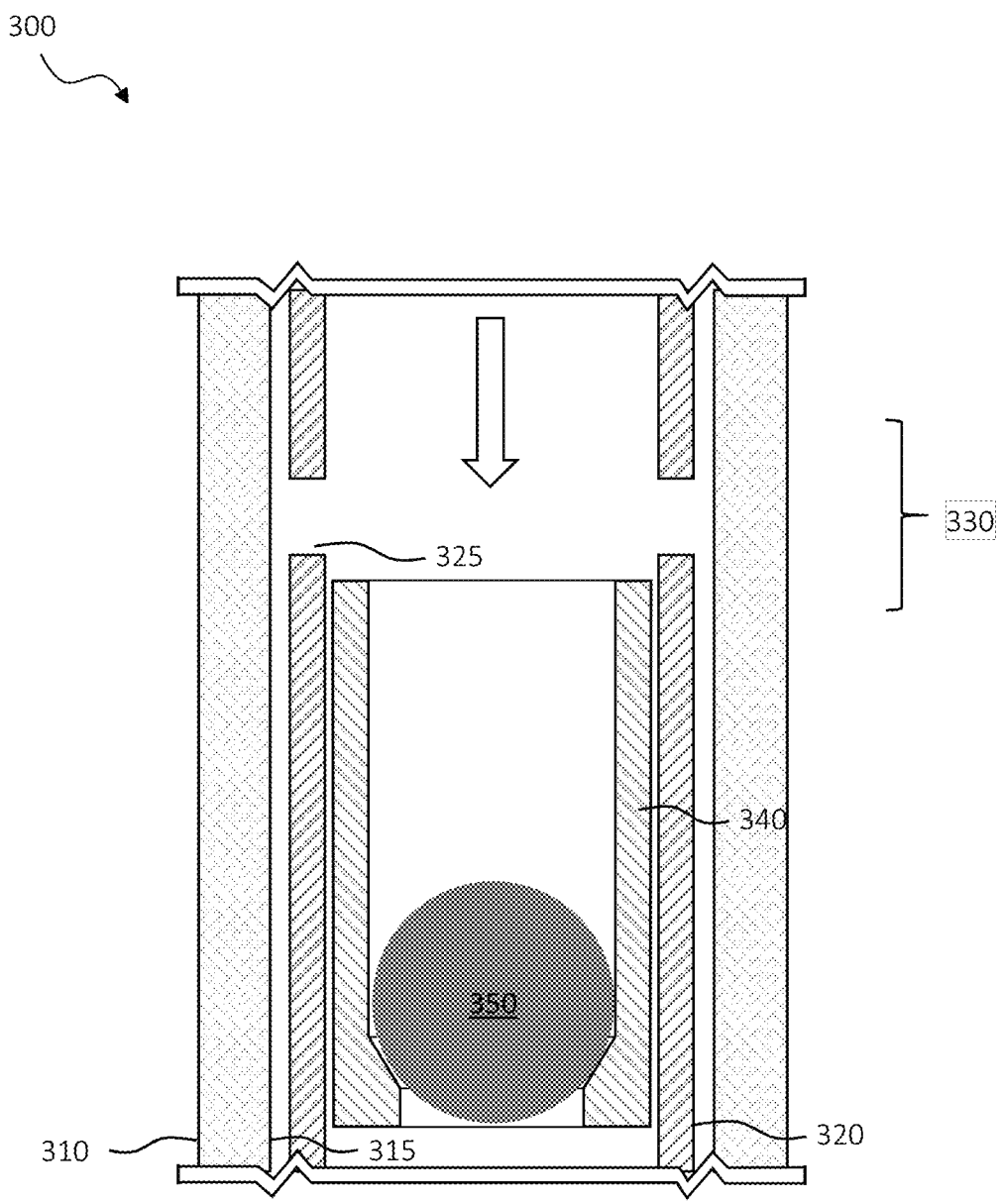

Turning to FIG. 3B, illustrated is the well system 300 of FIG. 3A after dropping a fracturing ball 350 within the wellbore tubing 320. In the illustrated embodiment, the fracturing ball 350 engages with the ball seat 345. Thereafter, pressure may be applied upon the fracturing ball 350 to move the sliding sleeve 340 to an open state. Accordingly, in the embodiment of FIG. 3B the port 325 is exposed to an interior of the wellbore tubing 320. The fracturing ball 350, in one embodiment, comprises a degradable material. However, in contrast to the filter plug discussed herein, the fracturing ball 350 need not (but may) include the filtration skeleton.

Figure 3C:
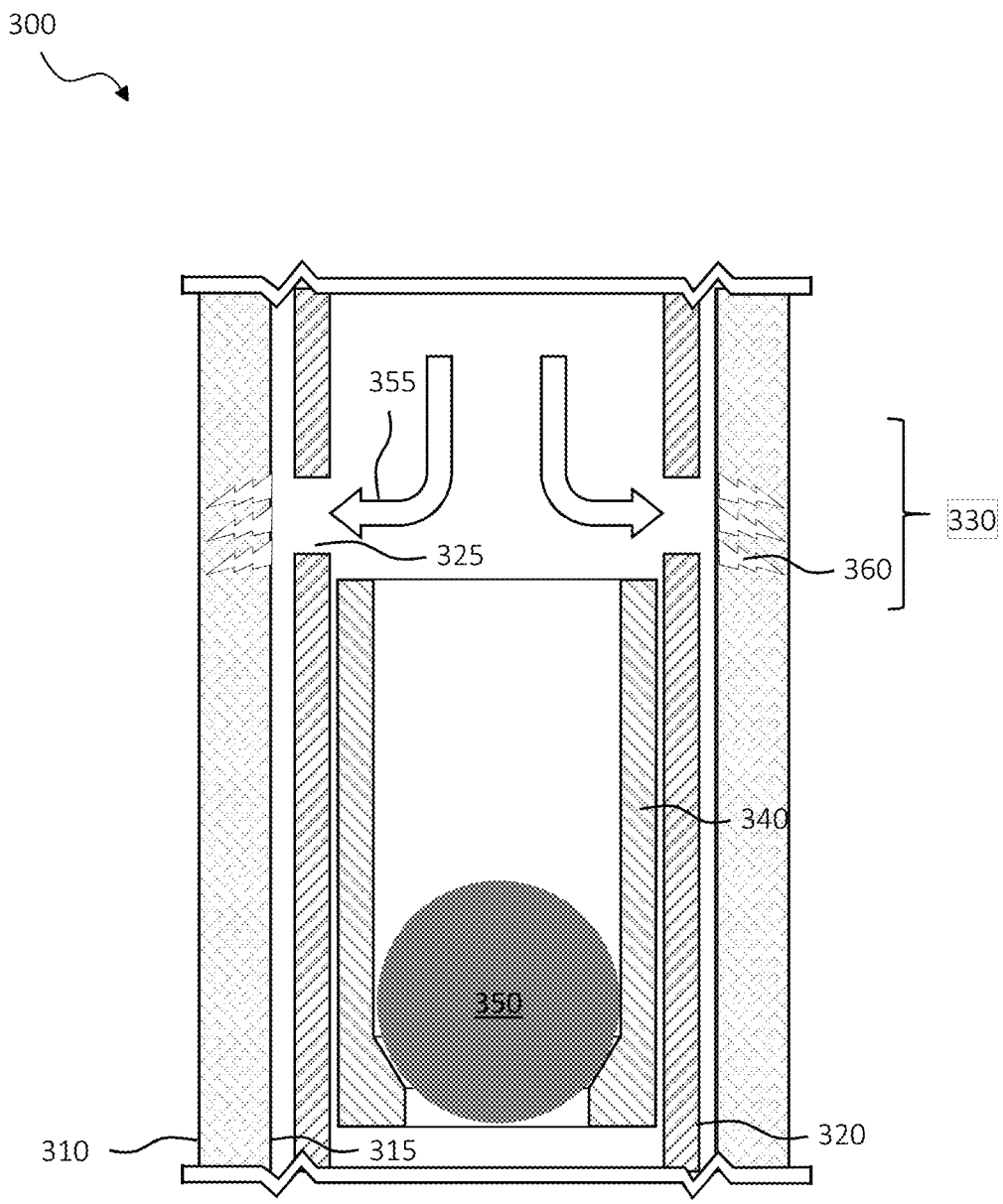

Turning to FIG. 3C, illustrated is the well system 300 of FIG. 3B after subjecting the exposed port 325 to high pressure fluid 355 (e.g., hydraulic fracturing) in the presence of particulate matter (e.g., proppant). What results, in the embodiment of FIG. 3C, are one or more fractures 360 in the subterranean formation 310 surrounding the exposed port 325. As discussed above, the particulate matter is designed to hold the one or more fractures 360 open after the high pressure fluid is removed. At this stage, the fracturing ball 350 remains within the sliding sleeve 340, thereby isolating features there below from the high pressure fluid 355.

Figure 3D:
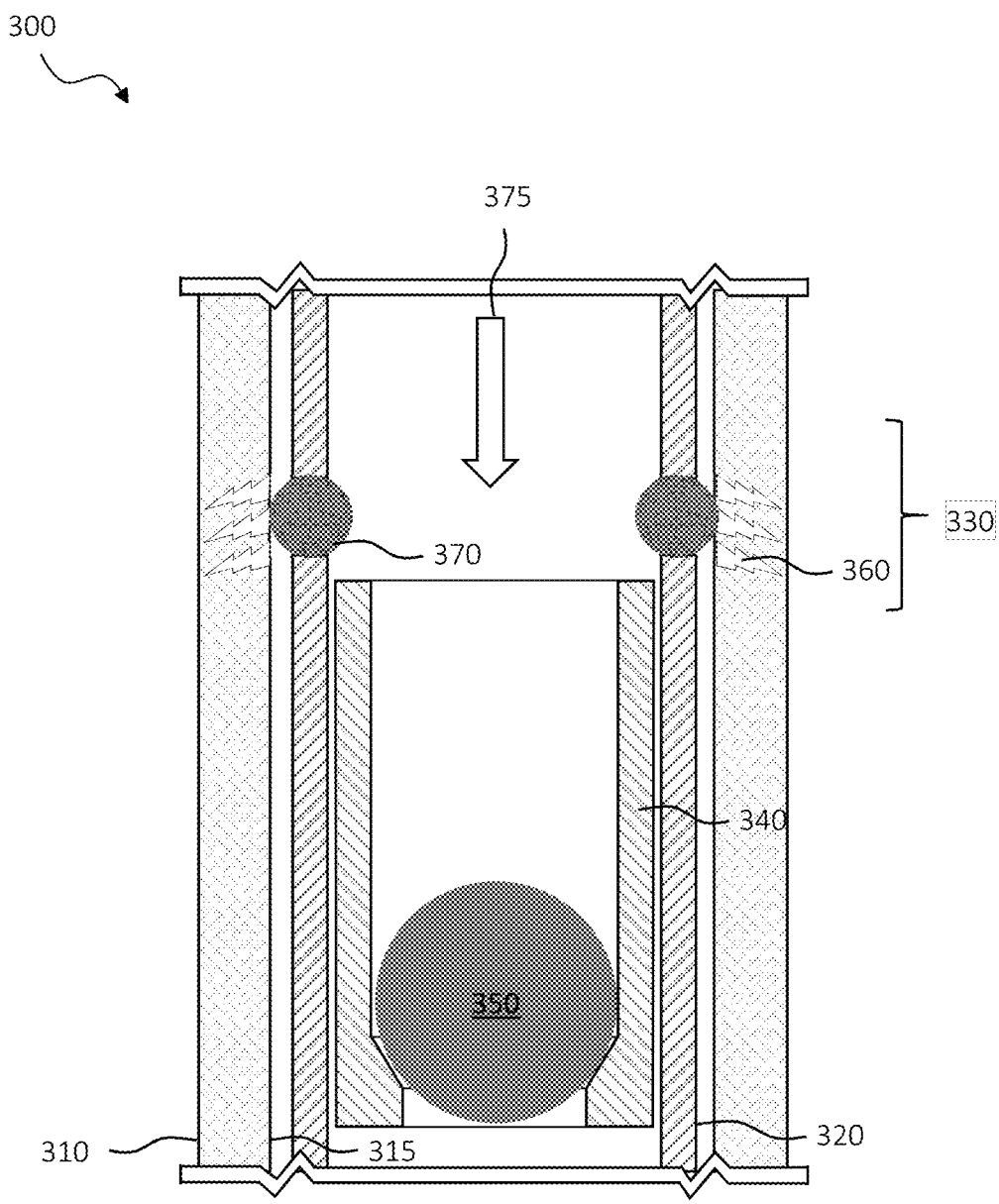

Turning to FIG. 3D, illustrated is the well system 300 of FIG. 3C after dropping one or more filter plugs 370 designed, manufactured and operated according to the disclosure within the wellbore tubing 320. The one or more filter plugs 370, in the illustrated embodiment, with the application of fluid under pressure 375, lodge within the one or more exposed ports 325 and proximate the one or more fractures 360. At this stage, the one or more filter plugs 370 include a filtration skeleton, as well as a degradable material in contact with the filtration skeleton. Accordingly, the one or more filter plugs 370 including the filtration skeleton and degradable material substantially plug the one or more ports 325. The one or more filter plugs 370 need not entirely plug the one or more ports 325 from fluid escaping, but ideally will allow little to none of the particulate matter to escape.

Figure 3E:
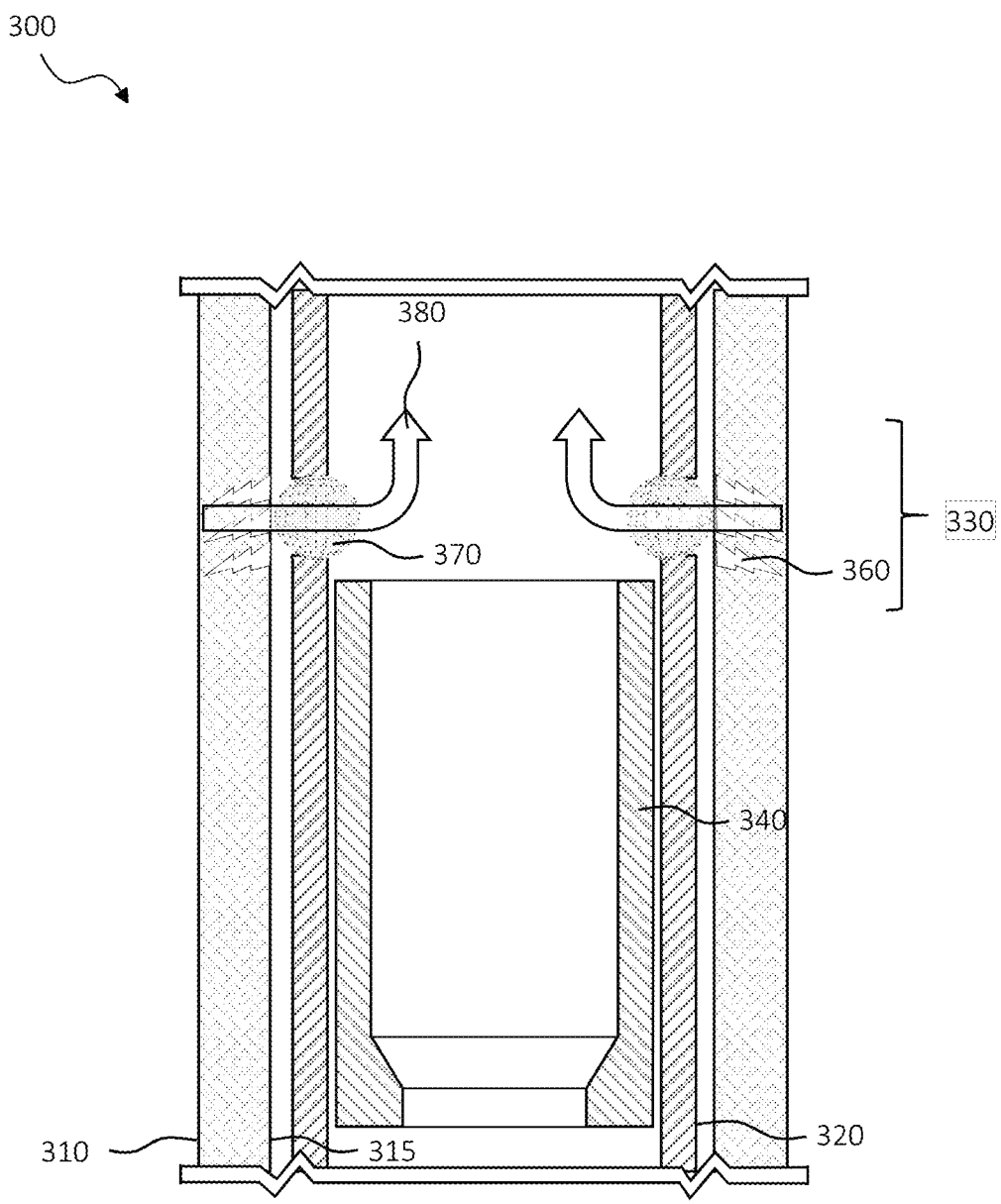

Turning to FIG. 3E, illustrated is the well system 300 of FIG. 3D after dissolving at least a portion of the degradable material from the one or more filter plugs 370 such that the degradable material no longer remains intact with the filtration skeleton. In one embodiment, the degradable material is configured to remain intact for at least 4 hours, and then naturally degrade. As the one or more filtration skeletons of the one or more filter plugs 370 remain lodged within the one or more ports 325, the one or more filtration skeletons may filter the particulate matter as production fluid 380 passes through the one or more ports 325 during production. Further, at this stage the fracturing ball 350 has degraded, thus providing access to the features there below.

The embodiment shown and discussed above has been illustrated as a ball-and-baffle configuration. Nevertheless, the present disclosure is not limited to only a ball-and-baffle configuration. In contrast, the present disclosure could equally be used with a plug-and-perforation configuration. Those skilled in the art, given the present disclosure, would readily understand how to employ the above teachings to a plug-and-perforation configuration.

Aspects Disclosed Herein Include:

A. A filter plug, the filter plug including: 1) a filtration skeleton; and 2) a degradable material in contact with the filtration skeleton, the filtration skeleton and degradable material configured to lodge within a port in a wellbore, and thus substantially plug the port when the degradable material remains intact with the filtration skeleton and allow the filtration skeleton to filter particulate matter as fluid passes there through when the degradable material no longer remains intact with the filtration skeleton.

B. A well system, the well system including: 1) a wellbore extending through one or more subterranean formations; 2) wellbore tubing located within the wellbore, the wellbore tubing having one or more ports located at one or more different zones of interest; and 3) one or more filter plugs lodged within associated ones of the one or more ports, each of the one or more filter plugs including: a) a filtration skeleton; and b) a degradable material in contact with the filtration skeleton, the filtration skeleton and degradable material configured to lodge within a port in a wellbore, and thus substantially plug the port when the degradable material remains intact with the filtration skeleton and allow the filtration skeleton to filter particulate matter as fluid passes there through when the degradable material no longer remains intact with the filtration skeleton.

C. A method for fracturing a well system, the method including: 1) dropping a fracturing ball within wellbore casing located within a wellbore extending through one or more subterranean formations, the fracturing ball engaging with and moving a sliding sleeve associated with the wellbore casing to expose a port located in the wellbore casing at a fracturing zone of interest; 2) subjecting the exposed port to high pressure fluid in the presence of particulate matter to form one or more fractures in the subterranean formation surrounding the exposed port; 3) dropping a filter plug within the wellbore casing, the filter plug lodging within the port and proximate the one or more fractures, the filter plug including: a) a filtration skeleton; and b) a degradable material in contact with the filtration skeleton, the filtration skeleton and degradable material substantially plugging the port when the degradable material remains intact with the filtration skeleton.

Aspects A, B, and C may have one or more of the following additional elements in combination: Element 1: wherein the filtration skeleton is a metal foam. Element 2: wherein the metal foam is an open cell metal foam. Element 3: wherein the filtration skeleton comprises a swellable material configured to swell when the degradable material no longer remains intact with the filtration skeleton. Element 4: wherein the filtration skeleton is in a first compressed state when the degradable material remains intact with the filtration skeleton, and moves to a second uncompressed state when the degradable material no longer remains intact with the filtration skeleton. Element 5: wherein the filtration skeleton comprises a single interconnected structure. Element 6: wherein the filtration skeleton comprises a collection of separate interconnected elements. Element 7: wherein the collection of separate interconnected elements is a self-assembling collection of separate interconnected acicular elements. Element 8: wherein the filtration skeleton includes a porosity operable to filter particulate matter having a maximum dimension of at least 140 mesh. Element 9: wherein the filtration skeleton includes a porosity operable to filter particulate matter having a maximum dimension of at least 80 mesh. Element 10: wherein the filtration skeleton includes a porosity operable to filter particulate matter having a maximum dimension of at least 40 mesh. Element 11: wherein the degradable material is a matrix of degradable material substantially filling the filtration skeleton. Element 12: wherein the degradable material is a layer of degradable material substantially surrounding the filtration skeleton. Element 13: wherein the degradable material is polyurethane. Element 14: wherein the degradable material is plastic. Element 15: wherein the degradable material includes a polylactic acid polymer, polyglycolic acid polymer, polyvinyl alcohol polymer or acetate polymer. Element 16: wherein the degradable material is borate, salt, sugar or a degradable metal. Element 17: wherein the degradable material is configured to remain intact for at least 1 hour. Element 18: further including dissolving at least a portion of the degradable material from the filter plug such that the degradable material no longer remains intact with the filtration skeleton, the filtration skeleton remaining lodged within the port and filtering the particulate matter as fluid passes through the port during production.

Those skilled in the art to which this application relates will appreciate that other and further additions, deletions, substitutions and modifications may be made to the described embodiments.

What is claimed is:

1. A filter plug, comprising:
a filtration skeleton; and
a degradable material filling at least a portion of the filtration skeleton, the filtration skeleton and degradable material configured to lodge within a port in a wellbore, and thus substantially plug the port when the degradable material remains intact with the filtration skeleton and allow the filtration skeleton to filter particulate matter as fluid passes there through when the degradable material no longer remains intact with the filtration skeleton.

2. The filter plug as recited in claim 1, wherein the filtration skeleton is a metal foam.

3. The filter plug as recited in claim 2, wherein the metal foam is an open cell metal foam.

4. The filter plug as recited in claim 1, wherein the filtration skeleton comprises a swellable material configured to swell when the degradable material no longer remains intact with the filtration skeleton.

5. The filter plug as recited in claim 1, wherein the filtration skeleton is in a first compressed state when the degradable material remains intact with the filtration skeleton, and moves to a second uncompressed state when the degradable material no longer remains intact with the filtration skeleton.

6. The filter plug as recited in claim 1, wherein the filtration skeleton comprises a single interconnected structure.

7. The filter plug as recited in claim 1, wherein the filtration skeleton comprises a collection of separate interconnected elements.

8. The filter plug as recited in claim 7, wherein the collection of separate interconnected elements is a self-assembling collection of separate interconnected acicular elements.

9. The filter plug as recited in claim 1, wherein the filtration skeleton includes a porosity operable to filter particulate matter having a maximum dimension of at least 140 mesh.

10. The filter plug as recited in claim 1, wherein the filtration skeleton includes a porosity operable to filter particulate matter having a maximum dimension of at least 80 mesh.

11. The filter plug as recited in claim 1, wherein the filtration skeleton includes a porosity operable to filter particulate matter having a maximum dimension of at least 40 mesh.

12. The filter plug as recited in claim 1, wherein the degradable material is a matrix of degradable material substantially filling the filtration skeleton.

13. The filter plug as recited in claim 1, wherein the degradable material is a layer of degradable material substantially surrounding the filtration skeleton.

14. The filter plug as recited in claim 1, wherein the degradable material is polyurethane.

15. The filter plug as recited in claim 1, wherein the degradable material is plastic.

16. The filter plug as recited in claim 1, wherein the degradable material includes a polylactic acid polymer, polyglycolic acid polymer, polyvinyl alcohol polymer or acetate polymer.

17. The filter plug as recited in claim 1, wherein the degradable material is borate, salt, sugar or a degradable metal.

18. The filter plug as recited in claim 1, wherein the degradable material is configured to remain intact for at least 1 hour.

* * * * *